(12) United States Patent
Buchanan, IV

(10) Patent No.: US 11,422,624 B2
(45) Date of Patent: *Aug. 23, 2022

(54) HAND INTERFACE DEVICE UTILIZING HAPTIC FORCE GRADIENT GENERATION VIA THE ALIGNMENT OF FINGERTIP HAPTIC UNITS

(71) Applicant: CONTACT CONTROL INTERFACES, LLC, West Chester Township, OH (US)

(72) Inventor: Thomas F. Buchanan, IV, Cincinnati, OH (US)

(73) Assignee: CONTACT CONTROL INTERFACES, LLC, West Chester Township, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/077,757

(22) Filed: Oct. 22, 2020

(65) Prior Publication Data

US 2021/0041952 A1 Feb. 11, 2021

Related U.S. Application Data

(63) Continuation of application No. 16/137,989, filed on Sep. 21, 2018, now Pat. No. 10,845,876.

(60) Provisional application No. 62/563,883, filed on Sep. 27, 2017.

(51) Int. Cl.
G06F 3/01 (2006.01)

(52) U.S. Cl.
CPC .............. *G06F 3/014* (2013.01); *G06F 3/011* (2013.01); *G06F 3/016* (2013.01); *G06F 3/017* (2013.01)

(58) Field of Classification Search
None
See application file for complete search history.

(56) References Cited

U.S. PATENT DOCUMENTS

| | | | |
|---|---|---|---|
| 5,354,162 A | 10/1994 | Burdea et al. | |
| 5,429,140 A | 7/1995 | Burdea et al. | |
| 5,631,861 A | 5/1997 | Kramer | |
| 6,128,004 A | 10/2000 | McDowall et al. | |
| 6,454,681 B1 | 9/2002 | Brassil et al. | |
| 6,862,006 B2 | 3/2005 | Sato et al. | |
| 6,967,596 B2 | 11/2005 | Nguyen | |
| 7,805,214 B2 | 9/2010 | Yamauchi et al. | |
| 8,849,453 B2 | 9/2014 | Bergelin et al. | |
| 9,104,271 B1* | 8/2015 | Adams | G06F 3/014 |
| 10,055,019 B2 | 8/2018 | Beran | |
| 10,065,114 B2 | 9/2018 | Goetgeluk et al. | |
| 10,137,362 B2 | 11/2018 | Buchanan, IV et al. | |
| 10,248,200 B2 | 4/2019 | Cohen et al. | |
| 10,275,046 B2 | 4/2019 | Zhang et al. | |
| 10,296,086 B2* | 5/2019 | Rimon | G02B 27/0172 |
| 10,310,608 B1 | 6/2019 | Keller et al. | |
| 10,386,926 B2 | 8/2019 | Rain et al. | |

(Continued)

*Primary Examiner* — Chad M Dicke
(74) *Attorney, Agent, or Firm* — Dinsmore & Shohl LLP

(57) ABSTRACT

A hand interface device is provided comprising: A glove portion to be worn on top of a user's hand, including a plurality of anchoring finger caps circumscribed around the extremities of the user's fingers and thumb; at least one haptic actuator housed within each of the anchoring finger caps; a housing structure attached to the forearm; and a plurality of wires running between at least one haptic actuator and the housing structure.

20 Claims, 6 Drawing Sheets

(56) References Cited

U.S. PATENT DOCUMENTS

| | | | |
|---|---|---|---|
| 11,009,956 B2* | 5/2021 | Ogita | G06F 3/03547 |
| 2003/0016207 A1 | 1/2003 | Tremblay et al. | |
| 2004/0104941 A1 | 6/2004 | Natoli | |
| 2006/0156848 A1 | 7/2006 | Gosselin et al. | |
| 2007/0290988 A1* | 12/2007 | Nogami | G06F 3/016 |
| | | | 345/156 |
| 2008/0094351 A1 | 4/2008 | Nogami et al. | |
| 2011/0071664 A1 | 3/2011 | Linn et al. | |
| 2012/0157263 A1 | 6/2012 | Sivak et al. | |
| 2014/0141907 A1 | 5/2014 | Schwenger et al. | |
| 2016/0059412 A1 | 3/2016 | Oleynik | |
| 2016/0342207 A1* | 11/2016 | Beran | G06F 3/0304 |
| 2017/0165567 A1 | 6/2017 | Walters | |
| 2017/0168576 A1* | 6/2017 | Keller | G06F 3/016 |
| 2017/0220111 A1 | 8/2017 | Nakamura et al. | |
| 2017/0220112 A1 | 8/2017 | Nakamura et al. | |
| 2017/0262060 A1 | 9/2017 | Katsuki et al. | |
| 2017/0358235 A1* | 12/2017 | Daniels | A61M 21/00 |
| 2018/0196515 A1* | 7/2018 | Appleyard | G06F 3/011 |
| 2018/0335841 A1 | 11/2018 | Rubin et al. | |

* cited by examiner

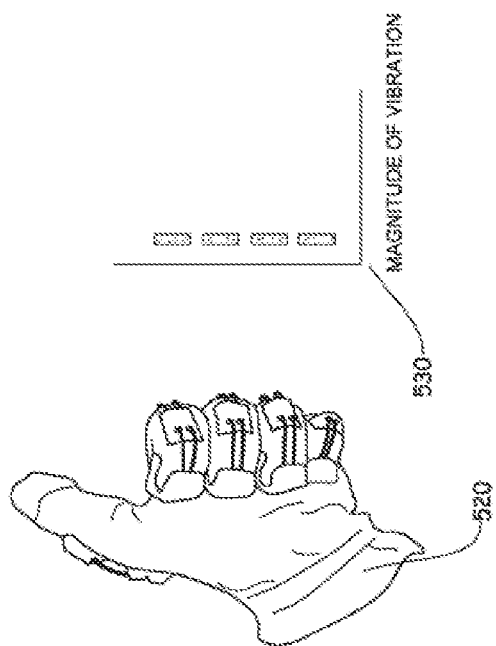
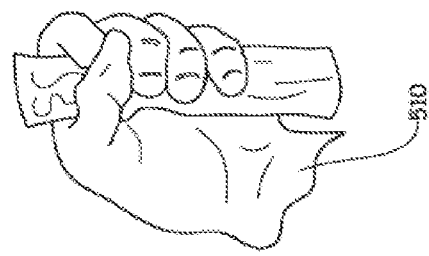
Fig. 5

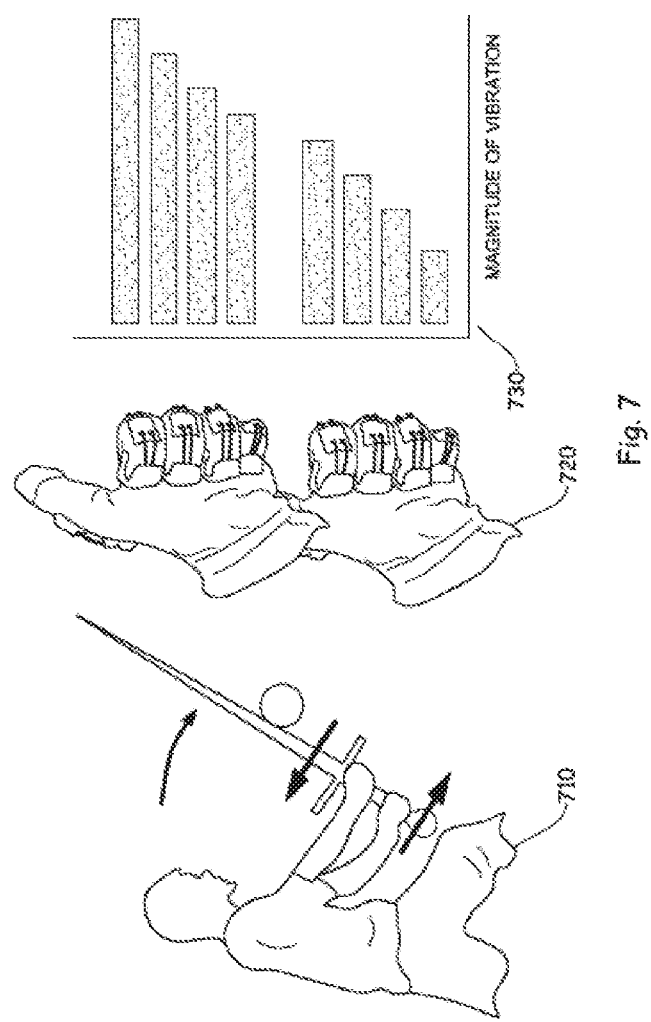

HAND INTERFACE DEVICE UTILIZING HAPTIC FORCE GRADIENT GENERATION VIA THE ALIGNMENT OF FINGERTIP HAPTIC UNITS

CROSS REFERENCE TO RELATED APPLICATION

This application is a continuation application of U.S. patent application Ser. No. 16/137,989 filed Sep. 21, 2018, which claims priority to U.S. Provisional Application No. 62/563,883 filed on Sep. 27, 2017, which are incorporated herein by reference.

BACKGROUND

Field of the Invention

The present invention relates to the field of interacting with a virtual environment using a hand interface glove. More specifically, the present invention relates to systems and devices utilizing a hand interface that replicates haptic sensations.

Description of the Related Art

The virtual reality experience industry has seen many changes over the years. As computing power has expanded, developers of virtual reality experiences have likewise created software that takes advantage of these increases in computing power. To this end, developers have been coding experiences that incorporate sophisticated operations and mathematics to produce a very realistic and immersive experience.

How users interact with objects in the virtual reality world is one of the most important factors in the immersive experience. A hand interface technology is an interface technology related to an interaction between the hands of a human and objects in a virtual space. The hand interface technology provides a deeper sense of immersion to a user by complementing visual and auditive special effects. For virtual reality, immersion can best be described as feeling physically present in a non-physical world. The addition of a sense of touch, on top of accurately and precisely tracked hand and finger movements contribute to feeling physically present.

However, what has been lacking in the prior art is an invention that replicates the haptics (a touch user interface) and feel of holding a controller while remaining a hands-free device. It is in the context of these problems that the current invention arises. Specifically, the problem that this invention is solving is the precise recreation of shape and structure, with the fingers and finger caps in closed form orientation, thereby giving a user the feeling of holding a controller in their hand.

One of the main advantages of using controllers in virtual reality is that in-game, a user can pick up an object and the physical mass of the controller is used to convince the brain that the user is actually holding that virtual object.

With the present invention, this same phenomenon occurs, when, in the closed grip position with the finger caps aligned, the physical space taken up by the finger caps when the user makes a closed fist, acts to replicate the sensation of gripping something within that tightened fist. However, this is not achieved with a hand interface device that is lacking finger caps. Without the caps, there is no additional mass within the inside of the closed grip to recreate that feeling of a controller.

As compared to the prior art wherein as soon as the user opens their hands and lets go of the controller, it falls and is left hanging off of their wrist by the wrist strap or drops to the ground if the strap is not employed properly. To regain functionality, the user must grab it again, something that can be quite difficult when one is wearing a virtual reality headset and can't physically see the controller without taking the headset off. Often, when the controller is also tracked in space, it is rendered as an object in the simulation, whether that be as a hand, gun, stick, or even as itself. Depending on the rendering, grabbing the controller again while keeping the headset on can have varying levels of difficulty. Whereas, with this invention, a user can just open their hands, and can still maintain full tracking of the fingers and hands, and then can reclose the hand to achieve the phenomenon again; indeed, that is the problem the invention is solving—to simulate effective haptic responses to virtual interactions while also allowing for accurate hand and finger tracking and functionality.

STATEMENT OF THE OBJECTS

Embodiments of the present invention provide for a hand interface system and device.

A further object of the invention is to generate haptic sensations without requiring an external device to be held.

Another object of the invention is to generate a haptic gradient when the finger caps are aligned and closed inside the palm and physically simulate the shape and structure of having an object in the hand.

A further object of the invention is to provide several separate vibrating motors in the finger tips used in conjunction with each other, to provide an enhanced experience over some of the held controllers that have a single haptic motor.

Still a further object of the invention is to provide haptic actuators capable of achieving differing and/or similar magnitudes of vibrations, allowing a user to experience varying degrees of interaction with objects in the virtual environment.

Still another object of the invention is to provide users with a complete virtual reality immersion experience.

Other objects and advantages of the present invention ill be set forth in part in the description and in the drawings that follow and, in part, will be obvious from the description or may be learned by practice of the invention.

It is to be understood that both the foregoing general description and the following detailed description of the present invention are exemplary and explanatory and are intended to provide further explanation of the invention as claimed.

SUMMARY

To achieve the foregoing objects, and in accordance with the purpose of the invention as broadly described herein, the present invention provides devices for accurately providing haptic feedback. Reference in the specification to one embodiment or an embodiment means that a particular feature, structure or characteristic described in connection with the embodiment is included in at least one embodiment of the invention. The appearance of the phrase "in one embodiment" in various places in the specification do not necessarily refer o the same embodiment.

It will be appreciated from the description of the hand interface systems and devices that they may be used in many environments and made in many embodiments. As used herein, a hand interface device may be utilized as a controller for a video game. However, it should be understood that the hand interface device does not necessarily have to be a controller utilized for playing games but may be used for interfacing with virtual objects on a display screen viewable by a user, and for any other suitable purpose for which input defined from the hand interface may be applied. It should be appreciated that the present invention can be implemented in numerous ways, such as a process, an apparatus, a system, a device or a method on a computer readable medium. Several inventive embodiments of the present invention are described below.

In one embodiment of the invention what is disclosed is a hand interface device comprising: a glove portion to be worn on top of a user's hand; a plurality of anchoring finger caps circumscribed around the extremities of the user's fingers and thumb; at least one haptic actuator housed within each of the anchoring finger caps; a housing structure attached to the forearm; and a plurality of wires running between at least one haptic actuator and the housing structure attached to the forearm.

In yet another embodiment of the invention the haptic actuators allow a user to experience haptic sensations upon interaction with objects in the virtual world.

In one embodiment of the invention a haptic gradient is formed upon the alignment of the anchoring finger caps in a closed first position.

In a further embodiment of the invention the haptic actuators can work independently and/or in conjunction/unison with each other to give the user an immersive experience.

In yet another embodiment of the invention each finger can experience varying magnitudes of vibrations.

In still another embodiment the haptic gradient is lost upon opening of the fist.

In a further embodiment the location of the haptic actuators can be varied within the anchoring finger caps.

In a further embodiment of the invention the haptic actuator is powered via the housing on the forearm.

In yet another embodiment of the invention the haptic actuator can be independently battery powered, wherein the finger caps house the battery and its corresponding circuitry.

The example embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims.

Additional aspects of the invention will be set forth in part in the description which follows, and in part will be obvious from the description, or may be learned by practice of the invention. The aspects of the invention will he realized and attained by means of the elements and combinations particularly pointed out the appended claims. It is to be understood that both the foregoing general description and the following detailed description are exemplary and explanatory only and are not restrictive of the invention, as claimed.

The present invention will now be described with reference to the following drawings, in which like reference numbers denote the same element throughout.

BRIEF DESCRIPTION OF THE DRAWINGS

FIGS. 4-7 depict various embodiments of the invention with their corresponding magnitudes of vibrations.

DETAILED DESCRIPTION

Embodiments of the present invention are described more fully below with reference to the accompanying drawings, which form a part hereof, and which show exemplary embodiments for practicing the invention. However, embodiments may be implemented in many different forms and should not be construed as limited to the embodiments set forth herein; rather these embodiments are provided so that this disclosure will be thorough and complete, and will fully convey the scope of the invention to those skilled in the art. The following detailed description is, therefore, not to be taken in the limiting sense.

Figure 1:
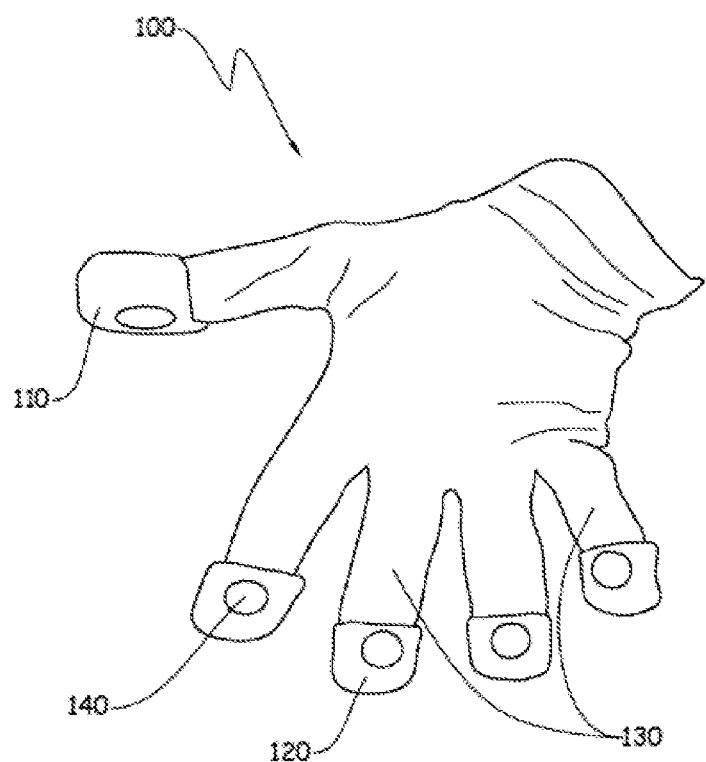
FIG. 1 is a schematic illustration of an embodiment of the haptic feedback system interfaced with a glove.

Referring now to the figures, FIG. 1 depicts a single open hand in one embodiment of the invention. The system consists of a glove 100, that an operator or user can wear on top of their hand. When worn by an operator, the glove, 100, allows the recreation of the sense of touch via haptic feedback. The glove, 100, consists of anchoring finger caps, 120, circumscribing the tips of each finger, 130 and the thumb, 110. Within the anchoring finger caps, 120, reside the haptic actuators, 140. The finger cap, 120, is essentially the end effector of the overarching glove system that this invention is currently installed into. The glove system is not necessary for this invention to work, though the glove can act as one, of many, capture methods of the fingers so that the positioning of the fingers and hand can be accurately represented in the virtual environment.

In its current implementation, the haptic actuator, 140 is powered via a housing on the forearm (not shown). This system could alternatively, also be independently battery powered, in which case, the finger cap could house the battery as well as the haptic actuator and its circuitry.

An emphasis in the design is to make it as comfortable as possible on the fingertip. This means that the material can either be a more flexible, rubbery material in order to form around the finger better or a more rigid plastic. In the case of a more rigid plastic, a foam, or material with similar properties, would want to line the interior to ensure the comfiest, best fit possible.

With regards to the material, changing the material can change the haptic effect achieved. Depending on the damping properties of the material, the location of the haptic actuation can be changed. A material with a high amount of damping will result in a more localized effect where the haptic actuator interacts with the finger of the wearer. A material with a low amount of damping will allow the effect from the haptic actuator to cause a greater amount of resonance in the material, resulting in a less localized sensation.

Varying sizes are also an option to accommodate different sized fingers and hands. A single hand is likely to use the same model, just scaled to fit the different fingers and thumb.

Figure 2:
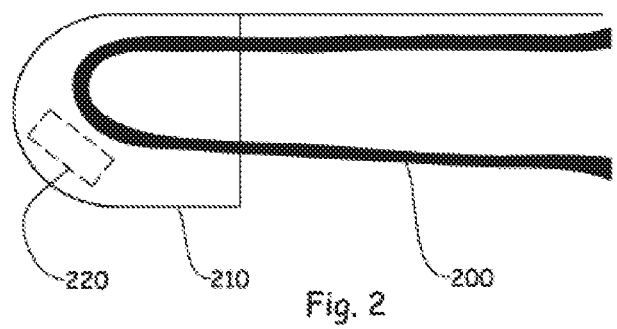
FIG. 2 is a schematic illustration of a single finger view of the haptic feedback system's interface in one embodiment of the invention.

Referring to FIG. 2, a single finger displaying an embodiment of the invention is now depicted. The finger, 200, has the finger anchoring cap 210, circumscribed to its distal end. The anchoring cap, 210, is capable of housing the haptic actuator, 220. By embedding a haptic actuator, 220, haptic sensations are possible upon interaction with objects in the virtual world. Upon touching an object in the virtual world, these actuators, 220, vibrate independently and at different frequencies or in unison at the same frequency to reproduce different touch sensations, allowing the user complete immersion in the virtual reality world.

The current system uses a linear resonance actuator (LRA) placed with a tight fit into the finger cap 210. The haptic actuator is the source of the haptic sensation that is then resonated throughout the finger cap depending on the finger cap material described above.

The actuator 220 is currently powered via USB but is also capable of battery power. It is preferably shaped small enough to fit within the anchoring finger cap 210. Varying the location within the finger cap 210 of the haptic actuator 220 can vary the haptic sensation achieved. For example, placing it directly on the pad of the finger on the palmar side will induce a different sensation from placing it on top of the finger nail. In another embodiment of the invention, if properly powered and the space is available, more than one haptic actuator is capable of being placed within a single finger cap to vary the sensation as well.

The haptic actuator will, at minimum, be capable of a single sensation, but will also be able to be driven to various magnitudes to impart varying degrees of sensation. On a single hand with five finger caps there will be a minimum of five haptic actuators (1 per finger). These will all be able to be controlled separately. This offers the opportunity for them all to be driven at the same magnitude but also be driven separately to achieve various degrees of sensation. The haptic actuator is not limited to a LRA. It can be replaced by an eccentric rotating mass (ERM) vibration motor or any other haptic actuator that is capable of at minimum, a single haptic sensation.

Figure 3:
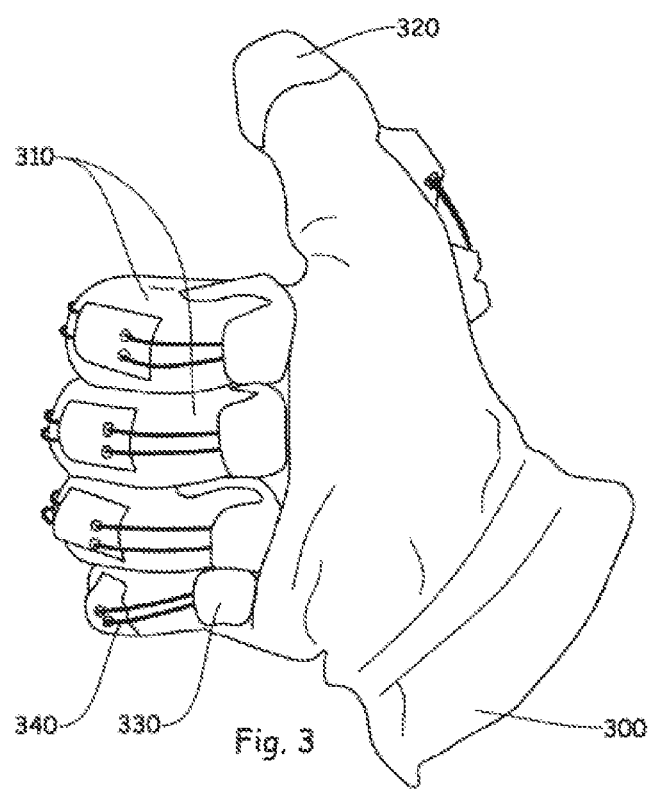
FIG. 3 is a schematic illustration of the closed first view of the haptic feedback interface in one embodiment of the invention.

FIG. 3 depicts an illustration of the hand interface device in a closed first position in accordance with one embodiment of the invention. In such a position the invention replicates the haptics (touch user interface) and feel of holding a controller while remaining a hands-free device. As depicted in FIG. 3, the fingers, 310 of the glove device 300 are in a closed first position with the anchoring caps 330 circumscribed at the end of the finger tips. The thumb 320 meanwhile does not have to be in the flexion position in order to achieve the haptic sensation. With the fingers 310 and finger caps 330 in the above orientation, the same feeling of holding a controller in your hand is achieved. Haptic motors, as described above reside within the finger caps, 330. With the addition of haptic motors in the finger caps a haptic gradient is then simulated along the fingers 310 and in the palm of the hands. Due to this haptic gradient being made up of several, separate motors used in conjunction with each other, there is potential for an enhanced experience over some of the held controllers that have a single haptic motor. Without the caps 330, there is no additional mass within the inside of the closed grip to recreate that feeling of a controller.

Further, attached internally to the anchoring caps, 330, are the power wires, 340. The wires allow the motors located internally within the caps 330 to be powered via a housing attached to the forearm of the user (not depicted). The housing is attached to the forearm, via a strap, buckles, or the whole arm can be inserted into a sleeve for a firm grip and minimal movement during attachment.

The key to achieving this overall system of the recreation of structure and shape in the hand along with a haptic gradient is the alignment of the fingers 310 with finger caps 330 in the palm of the hand. By aligning the caps of the fingers (this excludes the thumb) a basic cylindrical structure is achieved. Combined with a virtual reality headset (or for that matter, any computer simulation), when the simulation knows that this position has been achieved, or a user assumes this position after having picked up a virtual object in the virtual space, the brain can be convinced that various shapes and structures are within the hand (for example, the shaft of hammer, hilt of a sword, handle of a gun, etc).

Combined with the haptic feedback from the haptic actuators, as discussed above, movement of the objects in the hand can be achieved. For example, in real life, when a user hits a hammer to a nail, a reverberation can be felt throughout the hand. The haptic actuators in the finger caps 330, allow a similar sensation to be recreated via the haptic gradient run across the fingers 310. This overall sensation is not limited to the alignment of the four fingers (index, middle, ring, and pinky) but can be achieved with any combination of alignment.

The haptic gradient is also not limited to the alignment of the fingers within the palm, the same sensation can be achieved via alignment in any finger position relative to the hand. However, alignment outside of the palm lowers the likelihood that the haptic gradient would be convincing for a grasped object.

As compared to holding an actual controller, as soon as a user opens his/her hands and lets go of the controller, the controller falls and is left hanging to the user's wrist by the wrist strap or drops to the ground if the strap is not employed properly. To regain functionality, a user must grab it again, something that can be quite difficult when one is wearing a virtual reality headset and can't physically see the controller without taking the headset off. Depending on whether the controller is tracked in space and depending on how it is rendered, grabbing the controller again while keeping the headset on can have varying levels of difficulty. Whereas, with the current invention, a user can simply just open their hand, as displayed in FIG. 1, and still maintain full tracking of the fingers and hands. Thereafter, when the user recloses the hand with the hand interface device the same phenomenon with the haptic gradient can be achieved again; allowing the user to directly replicate the sense of touch and movement of an object in the hand in virtual reality.

Furthermore, a computer may use a variety of hand and finger tracking systems in order to compute a reliable and accurate understanding of the position of the user's finger and hands in three dimensional space. These systems can be wearable gloves covered in sensors that communicate positional data back to the computer and is then rendered as virtual hand position. Or this can be accomplished by computer vision systems placed on the headset or elsewhere that bounce light off of the user's hands to gather data. These are only some of the many options available. With the understanding of the position of the hand, the computer will interpret when a collision occurs between the user's hand (not limited to a closed fist), and a virtual object. Different virtual objects will have different characteristics programmed into them. Combining the knowledge of a collision and the characteristics of the object, the system will then output the appropriate vibration response to the hand of the user. This creates the illusion to the user that they are indeed touching/holding a virtual object and experiencing a haptic gradient, or lack thereof, when appropriate.

Figure 4:
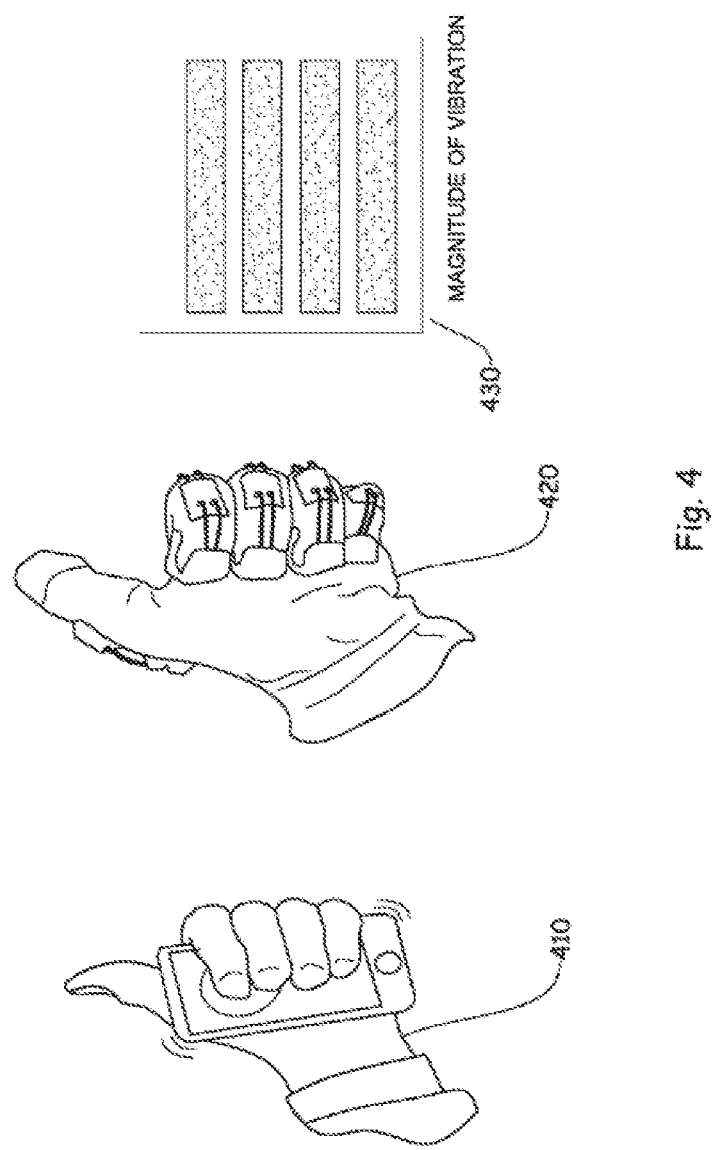

FIG. 4 displays one embodiment of the invention wherein the actual holding of an object compared with the virtual grip and its corresponding magnitude of vibration is displayed. In 410, the actual holding of a device, such as a cell phone, by a user is displayed. This phenomenon is then achieved in a virtual reality setting corresponding to the image 420, wherein the user is grasping a virtual cell phone or any other object capable of constant vibration. In such an instance, all the haptic motors in the glove device, as displayed in 420 can be activated to an equal magnitude to simulate the buzzing of that object. As displayed in the corresponding graph 430, wherein the magnitude of vibration for each associated individual finger of the glove device 420 is depicted. Each vibrating/haptic motor in the analogous finger of the glove device, 420 can be individually controlled and is capable of varying magnitudes of vibration, 430.

FIG. 5 displays another embodiment of the invention showing a different magnitude of vibration. As depicted at 510, the user is holding a piece of wood. In 520 the user is depicting holding this piece of wood in virtual reality, by enclosing the virtual object in the palm of the hands. However, in this instance there is no corresponding magnitude of vibration depicted on the graph, 530, as the haptic motors remain in-activated in this instance. For each of the corresponding fingers in 520, the adjacent magnitude of vibration, 530 is minimal. Hence a virtual object is being held in the glove device without having it interact with any outside force.

Figure 6:
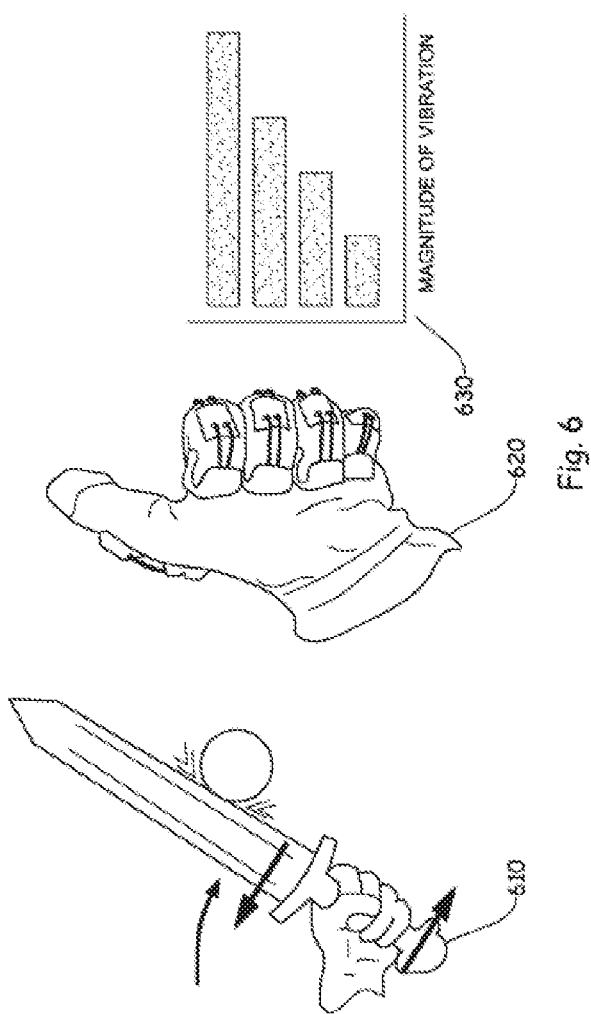

FIG. 6 displays a further embodiment of the invention utilizing the vibration from holding a virtual object such as a sword. One of the keys to the system is that the haptic gradient can be generated. For example, if the user is holding a virtual object such as a sword, 610, the user is able to swing that object and have it interact with another object in the virtual space, as depicted by hitting the ball in 610. In this instance, when a user swings the sword, the user would feel the recoil of the object in their hand, or in other words the object would pivot in the user's hands. For example, if a user hits an object with the sword and the sword is being held by the hilt. The end of the hilt closer to the blade would move in one direction while the other side of the hilt would move in the opposite direction, as depicted in 610.

Even though the vibration haptics cannot depict this change in direction by vibrating in one direction vs another, 620, what would instead be simulated is that, as depicted in 630, the vibration motor in the index finger could be operated at the highest magnitude with decreasing magnitude cascading through the remaining fingers. This provides a user the sensation of hitting the object and associated recoil in virtual reality.

FIG. 7 depicts a further embodiment of the invention wherein double hand wielding of a sword is depicted along with the corresponding magnitudes of vibration. As shown in 710, a user is utilizing both of their hands to wield the sword. In 730, depending on the interaction, the differences in magnitude between motors can vary. For example, in the instance depicted in 710, at that particular time, the upper hand, depicted in 720 is experiencing a stronger magnitude of vibration, versus the lower hand in the same image. This differing magnitude of vibration, as depicted in 730, allows an actual relay of haptic force to the user.

While the best modes for carrying out the invention have been described in detail, those familiar with the art to which this invention relates will recognize various alternative designs and embodiments for practicing the invention within the scope of the appended claims.

What is claimed is:

1. A hand interface device comprising:
    a glove portion configured to be worn on top of a user's hand, including a plurality of anchoring finger caps configured to be circumscribed around extremities of the user's fingers and thumb when the glove portion is worn on top of the user's hand;
    a plurality of haptic actuators housed within respective anchoring finger caps of the plurality of anchoring finger caps;
    a housing structure configured to be attached to a forearm of the user when the glove portion is worn by the user; and
    a plurality of wires running between the plurality of haptic actuators and the housing structure, wherein the hand interface device is configured to form a haptic gradient with the plurality of haptic actuators upon alignment of the plurality of anchoring finger caps in a palm of the user's hand by actuating the plurality of haptic actuators with increasing magnitudes across the plurality of anchoring finger caps.

2. The hand interface device of claim 1, wherein at least one haptic actuator of the plurality of haptic actuators can vibrate independently from remaining haptic actuators of the plurality of haptic actuators.

3. The hand interface device of claim 2, wherein each haptic actuator of the plurality of haptic actuators is capable of attaining a different magnitude of vibration from the remaining haptic actuators.

4. The hand interface device of claim 1, wherein at least one haptic actuator of the plurality of haptic actuators can vibrate in unison with respect to remaining haptic actuators of the plurality of haptic actuators.

5. The hand interface device of claim 4, wherein each haptic actuator of the plurality of haptic actuators is capable of attaining a same magnitude of vibration as the remaining haptic actuators of the plurality of haptic actuators.

6. The hand interface device of claim 1, wherein vibration of the plurality of haptic actuators allows the user to experience haptic sensations upon interaction with objects in a virtual world.

7. The hand interface device of claim 1, wherein a location of at least one haptic actuator of the plurality of haptic actuators can be varied within an anchoring finger cap.

8. The hand interface device of claim 1, wherein the hand interface device is configured to form the haptic gradient with the plurality of haptic actuators upon alignment of the plurality of anchoring finger caps in a closed first position.

9. The hand interface device of claim 8, wherein the hand interface device is configured to cease formation of the haptic gradient upon the opening of the user's fist.

10. The hand interface device of claim 8, wherein formation of the haptic gradient allows replication of physical hand movements in virtual reality.

11. The hand interface device of claim 1, wherein at least one haptic actuator of the plurality of haptic actuators is powered via the housing structure.

12. A hand interface system comprising:
    a glove portion configured to be worn on top of a user's hand, including a plurality of anchoring finger caps configured to be circumscribed around extremities of the user's fingers and thumb when the glove portion is worn on top of the user's hand;
    a plurality of haptic actuators housed within respective anchoring finger caps of the plurality of anchoring finger caps;
    a housing structure configured to be attached to a forearm of the user when the glove portion is worn by the user; and
    a plurality of wires running between the plurality of haptic actuators and the housing structure, wherein the hand interface system is configured to actuate the plurality of haptic actuators upon alignment of the plurality of anchoring finger caps in a palm of the user's hand.

13. The hand interface system of claim 12, wherein at least one haptic actuator of the plurality of haptic actuators can vibrate independently from remaining haptic actuators of the plurality of haptic actuators.

14. The hand interface system of claim 13, wherein each haptic actuator of the plurality of haptic actuators is capable of attaining a different magnitude of vibration from the remaining haptic actuators.

15. The hand interface system of claim 12, wherein at least one haptic actuator of the plurality of haptic actuators can vibrate in unison with respect to remaining haptic actuators of the plurality of haptic actuators.

16. The hand interface system of claim 15, wherein each haptic actuator of the plurality of haptic actuators is capable of attaining a same magnitude of vibration as the remaining haptic actuators of the plurality of haptic actuators.

17. The hand interface system of claim 12, wherein vibration of the plurality of haptic actuators allows the user to experience haptic sensations upon interaction with objects in a virtual world.

18. The hand interface system of claim 12, wherein a location of at least one haptic actuator of the plurality of haptic actuators can be varied within an anchoring finger cap.

19. The hand interface system of claim 12, wherein the hand interface system is configured to form a haptic gradient with the plurality of haptic actuators upon alignment of the plurality of anchoring finger caps in a closed first position by actuating the plurality of haptic actuators with increasing magnitudes across the plurality of anchoring finger caps.

20. The hand interface system of claim 19, wherein the hand interface system is configured to cease formation of the haptic gradient upon the opening of the user's fist.

* * * * *